Sept. 16, 1958  H. W. JONES  2,852,148
TRANSPORTING EQUIPMENT FOR VEHICLES
Filed Dec. 16, 1953  4 Sheets-Sheet 1
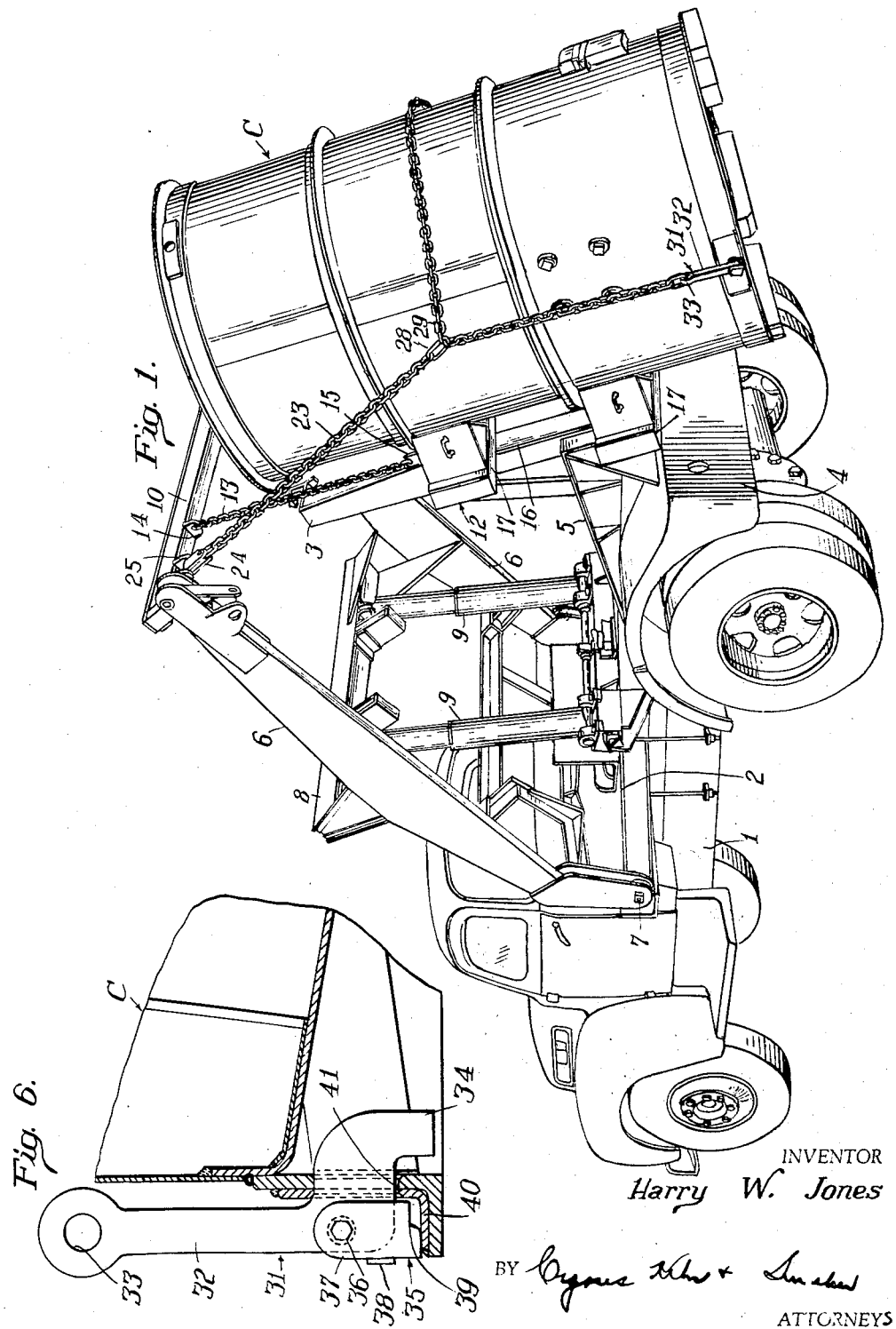
INVENTOR
Harry W. Jones
BY
ATTORNEYS

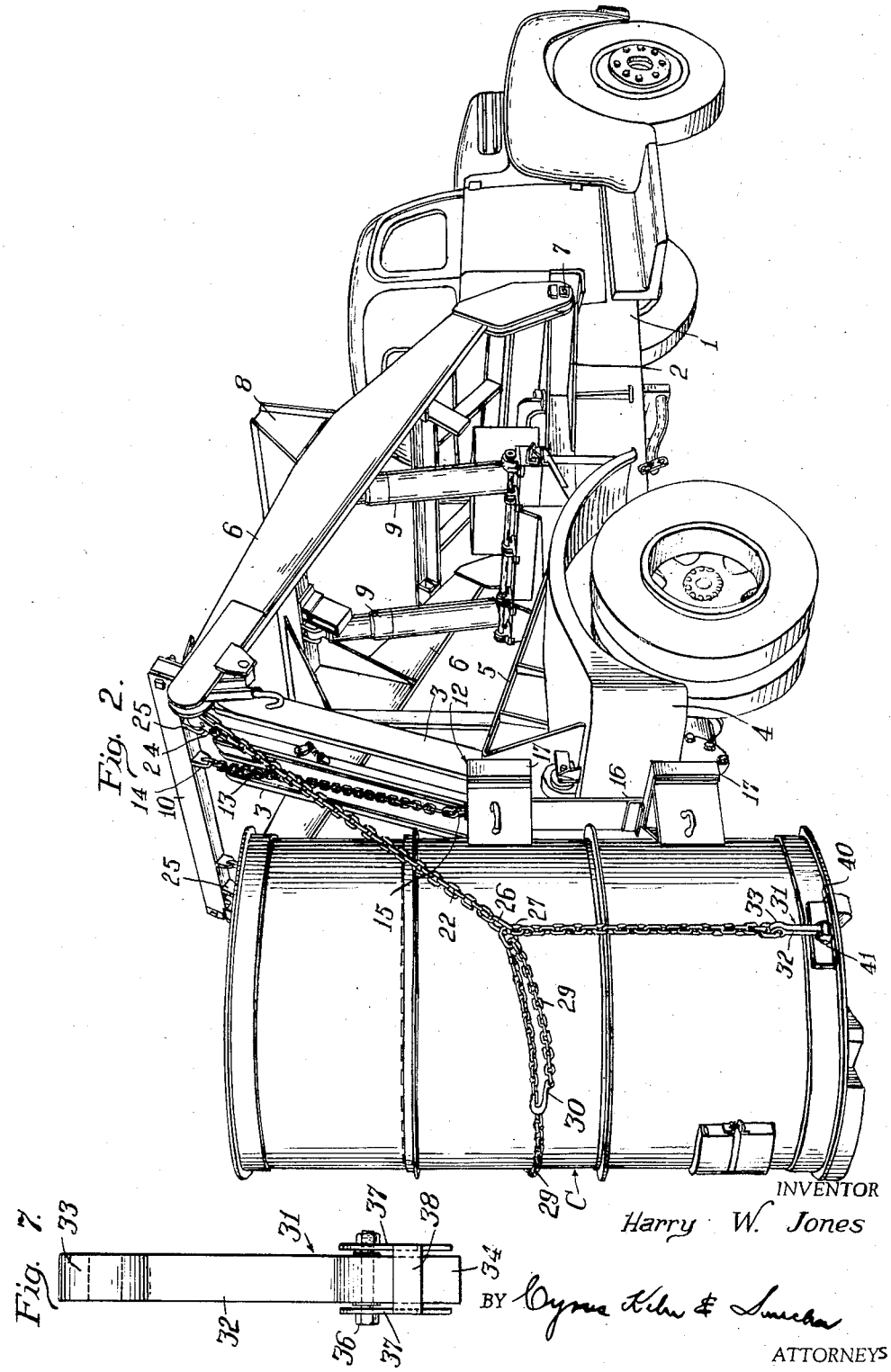

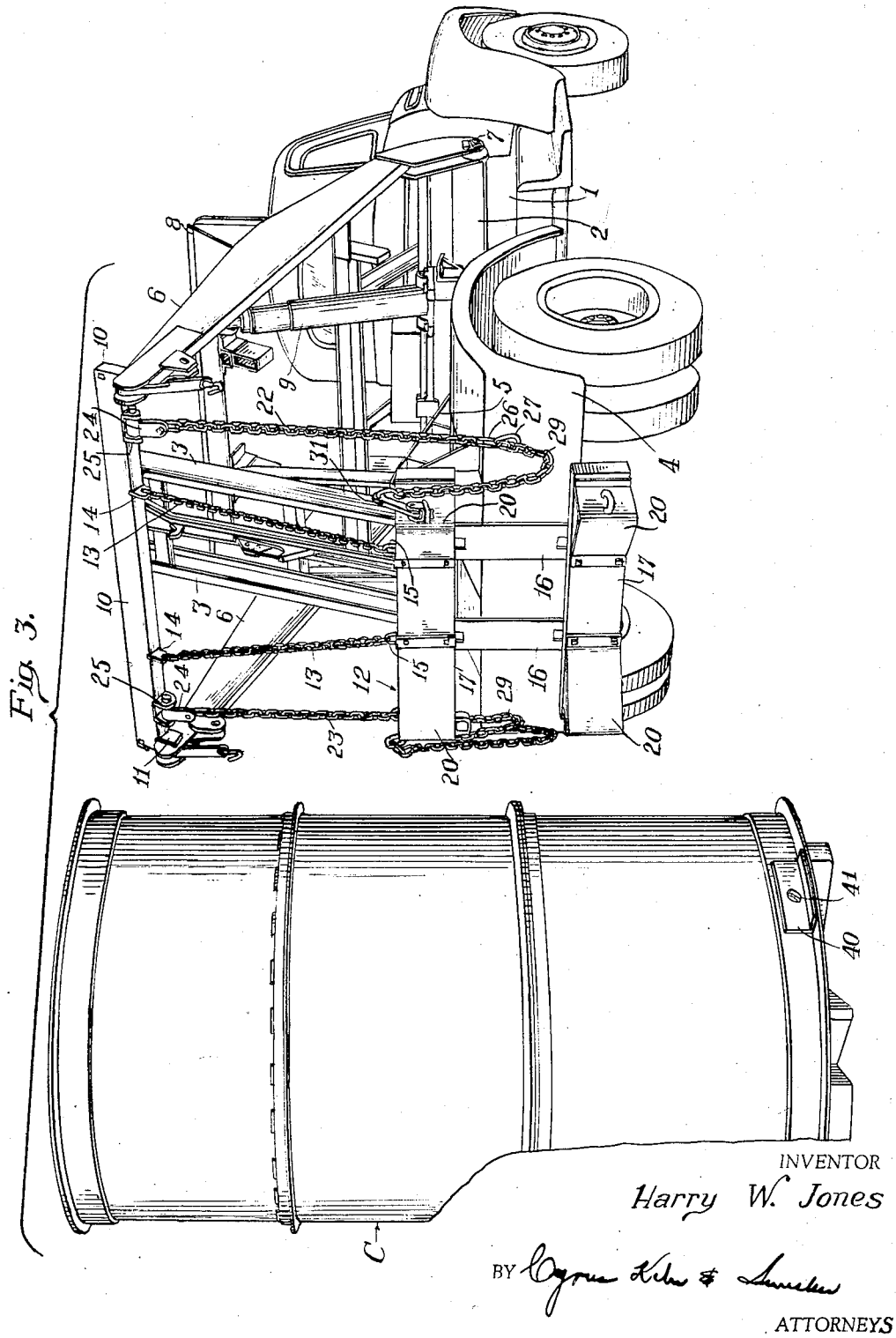

Sept. 16, 1958    H. W. JONES    2,852,148
TRANSPORTING EQUIPMENT FOR VEHICLES
Filed Dec. 16, 1953    4 Sheets-Sheet 4
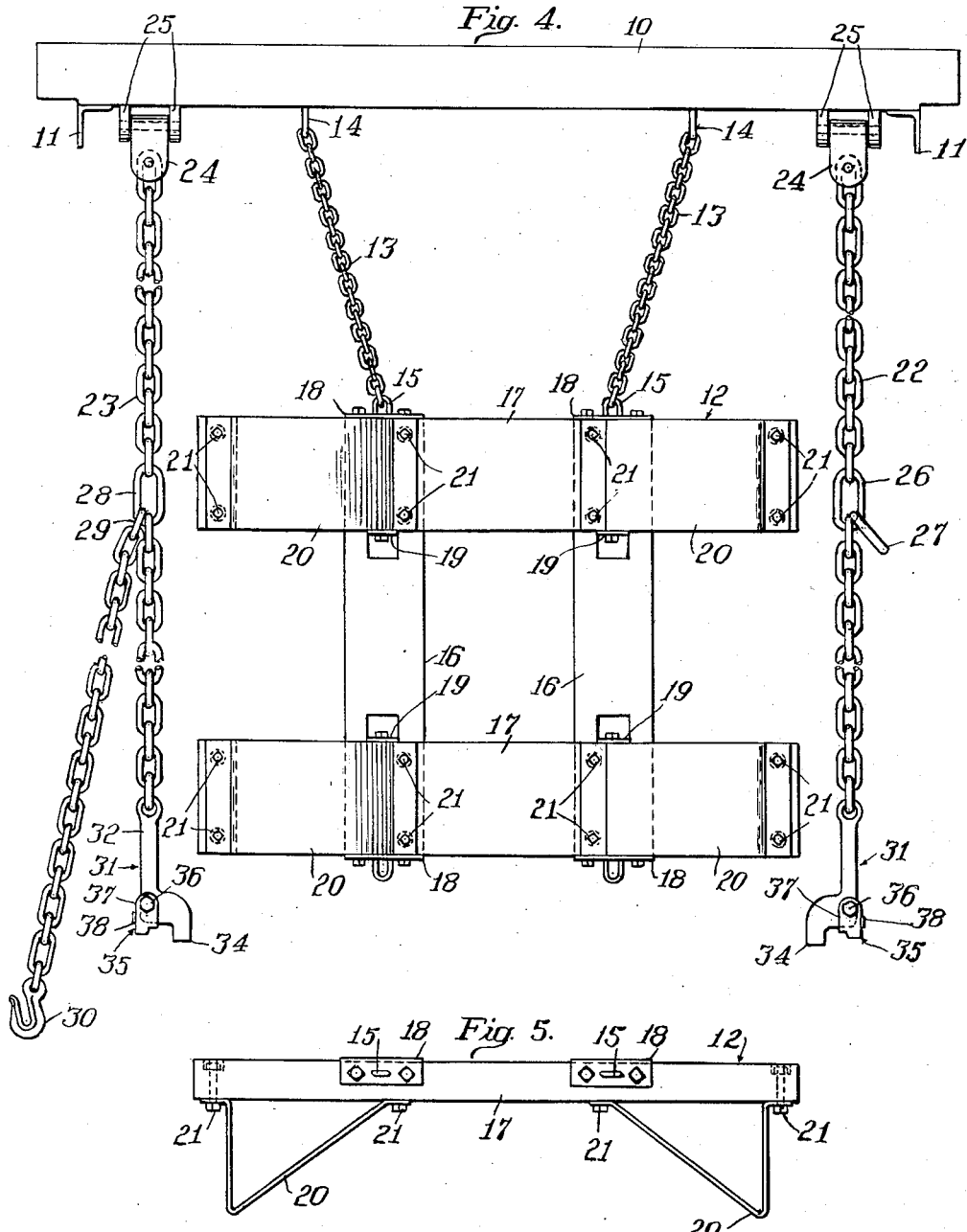
INVENTOR
Harry W. Jones
BY Cyrus Kehr & [Smucker]
ATTORNEYS 2,852,148
Patented Sept. 16, 1958

United States Patent Office

2,852,148

TRANSPORTING EQUIPMENT FOR VEHICLES

Harry W. Jones, Knoxville, Tenn., assignor to Dempster Brothers, Inc., Knoxville, Tenn., a corporation of Tennessee Application December 16, 1953, Serial No. 398,476

14 Claims. (Cl. 214—77)

This invention relates to improvements in transporting equipment for vehicles, and more particularly to the lifting and transporting of cylindrical articles and containers.

It has been the practice heretofore to provide containers for heavy objects, such as aircraft engines, in the form of cylindrical receptacles that are sealed. Because of the weight and bulk thereof, it is extremely difficult to lift and transport such heavy cylindrical containers. Various provisions have been attempted for this purpose, but for the most part these have not been very satisfactory, due to the difficulty encountered in securing engagement with the container sufficient in character to lift the heavy weight thereof.

One object of this invention is to provide transporting equipment on a vehicle having provision for secure engagement with heavy cylindrical articles and containers which will elevate and transport the object on the vehicle.

Another object of the invention is to improve the construction of transporting equipment to provide for secure attachment to a cylindrical container or object, sufficient to lift it onto a seated position on the vehicle and to hold it in place during transportation.

A still further object of the invention is to provide stabilizing mechanism on a transporting vehicle capable of engaging and lifting a cylindrical container or article onto a suitable position on the vehicle and to hold it in place during transportation thereon.

These objects may be accomplished, according to one embodiment of the invention, by providing mechanism for secure engagement with the cylindrical container or article and provided with means for attachment to lifting mechanism on the vehicle to raise and lower the container with respect thereto. The stabilizing mechanism preferably includes a saddle which is held in place with respect to the vehicle, as by being suspended from the hoisting unit thereon. The stabilizing saddle is constructed to receive the cylindrical container or article and to hold it in place against rolling or turning with respect to the hoisting unit during transportation. Diverging portions are provided on the saddle to embrace the cylindrical container. The saddle is provided with members arranged to slide on guideways provided on the hoisting unit so as to receive the container on the saddle and thereafter to move upward on the guides by the action of the hoisting unit with the container in place on the saddle.

Provision is made for secure connection with the container as by means of flexible devices connected with opposite sides of the container and extending therefrom to the hoisting unit on the vehicle. Lifting hooks are employed, preferably, connected with the respective flexible devices and extending into hook engagement with the container. Such hook engagement usually is provided at the bottom of the container by engagement in holes provided therein. An embracing section of flexible device may extend around in back of the container to hold the latter in place on the saddle.

This embodiment of the invention is illustrated in the accompanying drawings, in which:

Fig. 1 is a perspective view showing a hoisting unit on a vehicle with a cylindrical container in elevated position thereon and having the invention used in connection therewith;

Fig. 2 is a similar view from the opposite side and showing the container resting on the ground ready to be lifted, but with the parts in operative connection therewith;

Fig. 3 is a similar view showing the hoisting means in lowered position ready for engagement with the container, but separated therefrom;

Fig. 4 is a rear elevation showing a portion of the hoisting means and with the flexible devices and stabilizing saddle;

Fig. 5 is a top plan view of the saddle detached;

Fig. 6 is a partial vertical section through a portion of the container, showing a lifting hook in position with respect thereto and in elevation; and Fig. 7 is an elevation of the lifting hook, taken at right angles to Fig. 6.

The invention is illustrated in the accompanying drawings as applied to transporting equipment of the type disclosed in the Dempster Patent No. 2,179,779, granted November 14, 1939, wherein the vehicle is provided at the rear of the chassis with an upwardly extending skid frame mounted on a carriage that is movable forward and backward with respect to the vehicle. However, it is to be understood that the invention is not limited to use with a hoisting unit of that character because it may be applied readily to hoisting units wherein the skid frame is not movable, but is fixed with respect to the chassis, as shown for example in the Dempster Patent No. 2,069,697, granted February 2, 1937.

In the embodiment of the invention illustrated in the drawings, particularly in Figs. 1, 2 and 3 thereof, the chassis of an automotive truck is designated generally by the numeral 1. This truck 1 is of the conventional type, being hand-steered and self-propelled, merely as an example of a type that may be used in connection with the invention.

Mounted on the chassis 1 is a base frame 2 which may be secured rigidly to the chassis frame and extends forward and backward with respect thereto. An upright skidway includes laterally spaced bars 3 and is provided at the rear end of the hoisting frame 2, projecting upward from a cross bumper or guard plate 4 at the rear end of the chassis. The laterally spaced skid frame bars 3 are suitably braced in rigid relation to each other and securely mounted upon the base frame 2.

If the hoisting unit be constructed in the form shown in the Dempster Patents Nos. 2,179,779 and 2,633,259, March 31, 1953, the skid frame 3 will be mounted on a carriage movable lengthwise on tracks provided in the base frame 2. Such forward movement may be desired if the invention is adapted for handling cylindrical containers or other articles that may be seated upon the rear portion of the chassis, in which event an inclined seat should be provided thereon, as indicated at 5, adapted to receive and hold the container or other article in place on the chassis during transportion. On the other hand, if the hoisting mechanism is not of the form shown in said patents adapted to include means for moving the container forward and backward with respect to the chassis while engaged by the hoisting unit, the skid frame 3 may be fixed in its relation to the chassis frame and the inclined seat 5 may then be omitted.

The hoisting mechanism comprises a boom structure including a pair of upright arms 6 pivotally supported at 7 on the frame 2. These boom arms 6 are spaced apart adjacent opposite sides of the chassis in position to substantially embrace the container or other article to be lifted and transported. The boom arms 6 are connected together intermediate their lengths by a bridge structure 8. Hydraulic mechanism is used for raising and lowering the boom. In the illustrated embodiment, this hydraulic mechanism comprises a pair of hydraulic power devices, generally indicated at 9, each of which comprises a cylinder and piston in telescoped relation. Each of the hydraulic power devices is pivoted at one end upon the frame 2 and at the opposite end is pivoted to the bridge structure 8. Upon expansion of the hydraulic power devices, the boom will be raised with respect to the chassis frame and conversely it will be lowered upon contraction thereof.

The rear end portions of the boom arms 6 are shown as connected together by a cross bar 10 which extends from side to side in bridging relation between the outer ends of the boom arms 6. This cross bar 10 is secured rigidly to the projecting ends of the boom arms by suitable fastening means, generally indicated at 11, which will secure the cross bar in seated position upon the upper faces of the boom arms so as to be connected thereto rigidly and to form a secure support. The article to be transported is suspended from the cross bar and the latter also holds in place the stabilizing saddle for the article.

The saddle is designated generally at 12 and is shown more in detail in Figs. 4 and 5. This saddle 12 is supported from the cross bar 10 by a pair of chains 13 or other suitable flexible devices secured at one end to ears 14 provided on the underside of the cross bar 10 and connected at the opposite ends thereof with eyelets 15 secured to the upper end portion of the stabilizing saddle 12.

The stabilizing saddle 12 comprises a pair of upright slide members 16 spaced apart or extending transversely sufficiently to engage and ride upon the skid frame members 3 as the saddle is moved upward and downward relative thereto. The slide members 16 may be in the form of plates of sufficient width to ride upon the skid frame bars and extending upward sufficiently to provide sufficient length for the stabilizing saddle.

At the upper and lower ends of the slide members 16 cross supports are provided, as indicated at 17. In the illustrated embodiment, these cross supports are shown as comprising wood members of sufficient width and thickness to form suitable supports for the article to be lifted and transported. They are attached securely to the slide members 16 and the latter may be turned over at their opposite ends on the outer edges of the cross supports, as indicated at 18. Out-struck brackets 19 may be provided also to engage the inner edges of the cross supports 17 to form secure connections between the slide members and the supports. These parts may be bolted or otherwise secured together.

At the outer ends of the respective cross supports 17, embracing and guide arms 20 are provided. Each of the arms 20 is shown in Fig. 5 as formed of sheet metal of substantial thicknes so as to be fairly sturdy and yet having some resilience to yield somewhat to heavy pressure supplied thereto so as to prevent denting of these arms by the articles supported thereon. Each arm is shown as formed of a side section extending at right angles to the adjacent cross support 17 and an inwardly directed section extending at approximately 60° thereto, with the opposite ends of the arm extending over approximately one-third of the length of the adjacent cross support from the outer end of the latter inwardly. The inner faces of the opposite arms 20 diverge in opposite directions, as will be apparent from Fig. 5, thus forming a somewhat channel-shaped guideway to receive the article therebetween. The opposite ends of each arm 20 are secured rigidly to the cross support 17 as by suitable fastening means 21.

Supported at the opposite ends of the cross bar 10 are chains 22 and 23, which are suspended from the cross bar, adapted to form a lifting support for the container. Each of the chains 22 and 23 is connected at one end with a saddle 24 pivotally mounted between spaced brackets 25 on the cross bar 10.

The chain 22 has an enlarged link 26 intermediate the end thereof which is interconnected with a separate ring 27 that normally hangs loose relative to the chain 22. The chain 23 also has an enlarged link 28 intermediate the ends thereof with which is connected one end of a chain 29, the opposite end of which chain 29 is provided with a hook 30. The chains 22 and 23 are adapted to be suspended beside the cylindrical container and the chain 29 extends around the rear of said container, as shown in Figs. 1 and 2, through the ring 27 and turned back upon itself with the hook 30, holding the chain 29 tightly applied to the container.

The free end of each chain 22 and 23 is connected with a lifting hook adapted for engagement with the container, one example of which lifting hook is illustrated in Figs. 6 and 7. In this embodiment the hook is designated generally at 31 and comprises an elongated body 32 having an eye 33 in one end 31 for secure connection with one of the chains 22, 23. The opposite end of the body 32 is provided with an offset finger 34 in such relation to the body 32 as to form substantially a Z-shaped body structure.

The hook 31 also includes a cam, generally indicated at 35, pivotally supported on the body 32 at 36. The cam 35 includes a pair of side plates 37 embracing opposite sides of the body 31. The plates 37 are connected together at the outer edge of the hook 31 by a cross bar 38 welded or otherwise secured to the plates. The plates 37 are also provided with notched shoulders 39 in the lower edges thereof, as shown in Fig. 6, to engage the lower flange of an angle member 40 secured to the bottom of the container C and having an opening 41 in said bottom edge portion as shown in Fig. 6.

It will be noted that a similar opening 41 is provided on each opposite side of the container and one of the hooks 31 is engaged therewith for supporting the container. The opposite end or finger 34 of each hook extends through the opening 41 and downward behind the wall portion of the container, as illustrated in Fig. 6. The cam 35 is then dropped into engagement with the shoulder 40 on the container below the hole 41. This secures the hook 31 effectively to the container and makes it practically impossible to shake the hook out of the hole. However, it may be released by lifting the cam 35 and then swinging the hook 31 out away from the container C sufficient to withdraw the finger 34 from the hole 41.

The stabilizing saddle 12 is shown in Fig. 3 in its normal carrying position and it may be moved into engagement with the container C merely by the act of backing up the truck or vehicle until the saddle engages the container. The arms 20 center the container with respect to the saddle and hold it in proper position transversely relative thereto.

After thus engaging the saddle with the container in the relation shown in Fig. 2, the chains 22 and 23 are carried downward on opposite sides of the container, as described, to the bottom thereof. The hooks 31 are engaged in the holes 41 at the bottom of the container and are locked therein by the cams 35. The back chain 29 is then carried around the rear wall of the container substantially in the relation shown in Fig. 2, and is extended though the ring 27 attached to the lifting chain 22, after which it is drawn back upon itself to take up the slack in the back chain 29 when the hook 30 is engaged with the body of the chain to hold the container C securely by the sling provided by the chains and in proper secure relation to the stabilizing saddle 12.

This structure serves to stabilize the cylindrical container against transverse rolling as it is lifted onto the vehicle from the position shown in Fig. 2 to the position shown in Fig. 1. This is accomplished by raising the boom arms 6 through the application of lifting pressure to the hydraulic power devices 9, pulling upward on the lifting chains 22 and 23. This upward movement has the effect not only of lifting the container, but also of raising both the container and the saddle 12 simultaneously. The saddle 12 is in engagement with the depending skirt 4, as well as skid frame 3, so as to slide up and down on these sliding surfaces during the raising and lowering movements of the container. Provision is made by lateral flanges on the slide members 16 or otherwise to prevent side slippage of the saddle during the raising and lowering movement, if such means should be required, although usually the weight of the container will be sufficient to prevent side slippage.

In this way the cylindrical container, even though of great weight, may be lifted and transported safely without danger of side rolling or slippage, inasmuch as the container is held securely in the saddle and the weight thereof upon the skid frame normally will prevent side sway.

While the invention has been illustrated and described in one embodiment, it is recognized that variations and changes may be made therein without departing from the invention as set forth in the claims.

I claim:

1. In transporting equipment for an elongated upright container, the combination of a hoisting unit adapted to be mounted on a vehicle chassis and including an upright skid frame and hoisting means movably mounted relative to the skid frame, a saddle slidably mounted on the skid frame for upward movement relative thereto, means operatively connecting the saddle with the hoisting means for movement of the saddle thereby, said saddle having vertically spaced pairs of outwardly projecting arms in positions for embracing the container, and flexible cable means connected with the hoisting means and depending therefrom for connection with the container to elevate the latter on the saddle.

2. In transporting equipment for an elongated upright container, the combination of a hoisting unit adapted to be mounted on a vehicle chassis and including an upright skid frame and hoisting means movably mounted relative to the skid frame, a saddle slidably mounted on the skid frame for upward movement relative thereto, means operatively connecting the saddle with the hoisting means for movement of the saddle thereby, said saddle having vertically spaced pairs of outwardly projecting arms in positions for embracing the container, and flexible cable means connected with the hoisting means and depending therefrom for connection with the container to elevate the latter on the saddle, said flexible cable means including hooks in positions to engage opposite sides of the container for detachable connection therewith.

3. In transporting equipment for an elongated upright container, the combination of a hoisting unit adapted to be mounted on a vehicle chassis and including an upright skid frame, laterally spaced boom arms mounted on the unit for upward movement relative to the skid frame, a cross bar connecting the boom arms together and supported thereby, a saddle slidably mounted on the skid frame for upward movement relative thereto, means for suspending the saddle from the cross bar, and flexible cable means connected at one end with the cross bar and extending laterally and outwardly therefrom for connection with the container when the latter is in lateral bearing relation with the saddle to hold the container against the saddle during said raising movement.

4. In transporting equipment for an elongated upright container, the combination of a hoisting unit adapted to be mounted on a vehicle chassis and including an upright skid frame, laterally spaced boom arms mounted on the unit for upward movement relative to the skid frame, a cross bar connecting the boom arms together and supported thereby, a saddle slidably mounted on the skid frame for upward movement relative thereto, means for suspending the saddle from the cross bar, and flexible cable means connected at one end with the cross bar and extending laterally and outwardly therefrom for connection with the container when the latter is in lateral bearing relation with the saddle to hold the container against the saddle during said raising movement, said flexible cable means including hooks constructed for detachable engagement with the container on opposite sides thereof.

5. In transporting equipment for an elongated upright container, the combination of a hoisting unit adapted to be mounted on a vehicle chassis and including an upright skid frame, laterally spaced boom arms mounted on the unit for upward movement relative to the skid frame, a cross bar connecting the boom arms together and supported thereby, a saddle slidably mounted on the skid frame for upward movement relative thereto, means for suspending the saddle from the cross bar, and flexible cable means connected at one end with the cross bar and extending laterally and outwardly therefrom for connection with the container when the latter is in lateral bearing relation with the saddle to hold the container against the saddle during said raising movement, said saddle having arms adjacent opposite sides thereof in positions for embracing relation with the container to hold the container in place thereagainst during the raising and lowering movements thereof.

6. In transporting equipment for an elongated upright container, the combination of a hoisting unit adapted to be mounted on a vehicle chassis and including an upright skid frame, laterally spaced boom arms mounted on the unit for upward movement relative to the skid frame, a cross bar connecting the boom arms together and supported thereby, a saddle slidably mounted on the skid frame for upward movement relative thereto, means for suspending the saddle from the cross bar, and flexible cable means connected at one end with the cross bar and extending laterally and outwardly therefrom for connection with the container when the latter is in lateral bearing relation with the saddle to hold the container against the saddle during said raising movement, said flexible cable means including a pair of chains each connected at one end with the cross bar and having a hook on the opposite end thereof in position for detachable engagement with the container.

7. In transporting equipment for an elongated upright container, the combination of a hoisting unit adapted to be mounted on a vehicle chassis and including an upright skid frame, laterally spaced boom arms mounted on the unit for upward movement relative to the skid frame, a cross bar connecting the boom arms together and supported thereby, a saddle slidably mounted on the skid frame for upward movement relative thereto, means for suspending the saddle from the cross bar, and flexible cable means connected at one end with the cross bar and extending laterally and outwardly therefrom for connection with the container when the latter is in lateral bearing relation with the saddle to hold the container against the saddle during said raising movement, said cross bar being spaced forwardly of the skid frame in position to pull forward on the container to hold the latter in lateral bearing relation against the saddle.

8. In transporting equipment for an upright cylindrical container having an opening in a side thereof, the combination of a hoisting unit including a flexible device, a hook connected with the flexible device and including a body portion having a laterally offset arm rigid therewith in position to extend through the opening into secure engagement with the container, and means for locking the hook in the opening, said locking means being spaced laterally from the offset arm and extending parallel therewith from the body portion of the hook and cooperating with said offset arm to straddle a portion of the container.

9. In transporting equipment for an upright cylindrical container having an opening in a side thereof, the combination of hoisting means adapted to be mounted on a vehicle chassis and including a flexible device, a hook carried by the flexible device and having an offset end portion rigid therewith in position to extend through the opening and to bear against the inner surface of the container, and a cam connected with the hook in position for pressure engagement against the outer side of the container to lock the hook in place in the opening.

10. In transporting equipment for an upright elongated container, the combination of a hoisting unit adapted to be mounted on a vehicle chassis and including hoisting means, an upright skid frame, a saddle including a pair of upright skid members mounted in laterally spaced relation on the skid frame, cross members connected with the upright skid members, each of the cross members having an outwardly extending arm on the outer end portion thereof in position for embracing relation with the container, and means for raising the saddle relative to the skid frame.

11. In transporting equipment for an upright container having an opening in a side thereof and including hoisting means for said container, the combination with said hoisting means, of a hook connected therewith, said hook including an elongated body having a finger offset from one end thereof substantially in Z-shape and rigid with the body adapted to enter the opening and to engage a portion of the container inside the opening, and a cam member connected with the elongated body at said end thereof and extending substantially parallel with the end extremity of said offset finger and spaced therefrom to engage a portion of the container outside the opening.

12. In transporting equipment for an upright container having an opening in a side thereof and including hoisting means for said container, the combination with said hoisting means, of a hook connected therewith, said hook including an elongated body having a finger offset from one end thereof substantially in Z-shape and rigid with the body adapted to enter the opening and to engage a portion of the container inside the opening, a cam member connected with the elongated body at said end thereof and extending substantially parallel with the end extremity of said offset finger and spaced therefrom to engage a portion of the container outside the opening, and means pivotally connecting the cam member with the elongated body of the hook.

13. In transporting equipment for an elongated upright container, the combination of a hoisting unit including upwardly movable hoisting means, a sling adapted to at least partially encircle a container and having means connected with the container for supporting the container thereby, a skid device on the hoisting unit separate from the sling for receiving and holding the container, and means connected with the hoisting means and with the sling and extending therebetween for holding the container against the skid device and for lifting the container relative to the hoisting unit.

14. In transporting equipment for an elongated upright container, the combination of a hoisting unit including upwardly movable hoisting means, a sling adapted to at least partially encircle a container and having means connected with the container for supporting the container thereby, a skid device on the hoisting unit separate from the sling for receiving and holding the container, means connecting the hoisting means with the sling for holding the container against the skid device and for lifting the container thereon relative to the hoisting unit, and means connecting the skid device with the hoisting means for lifting movement with the container when raised by the first-mentioned connecting means.

References Cited in the file of this patent

UNITED STATES PATENTS

| | | |
|---|---|---|
| 1,270,995 | Weickel | July 2, 1918 |
| 1,492,675 | Clark et al. | May 6, 1924 |
| 1,918,007 | Woodruff | July 11, 1933 |
| 2,127,607 | Levow | Aug. 23, 1938 |
| 2,150,821 | Dempster | Mar. 14, 1939 |
| 2,201,154 | Bruce | May 21, 1940 |
| 2,275,704 | Turner | Mar. 10, 1942 |
| 2,676,838 | Gardner | Apr. 27, 1954 |